(12) United States Patent
Ota et al.

(10) Patent No.: US 10,356,219 B2
(45) Date of Patent: Jul. 16, 2019

(54) IMAGE TRANSMISSION APPARATUS, INFORMATION PROCESSING TERMINAL, IMAGE TRANSMISSION METHOD, INFORMATION PROCESSING METHOD, PROGRAM, AND INFORMATION STORAGE MEDIUM

(71) Applicant: Sony Interactive Entertainment Inc., Tokyo (JP)

(72) Inventors: Osamu Ota, Tokyo (JP); Kazufumi Oyama, Saitama (JP)

(73) Assignee: Sony Interactive Entertainment Inc., Tokyo (JP)

( * ) Notice: Subject to any disclaimer, the term of this patent is extended or adjusted under 35 U.S.C. 154(b) by 309 days.

(21) Appl. No.: 15/115,757

(22) PCT Filed: Oct. 7, 2014

(86) PCT No.: PCT/JP2014/076863
§ 371 (c)(1),
(2) Date: Aug. 1, 2016

(87) PCT Pub. No.: WO2015/122052
PCT Pub. Date: Aug. 20, 2015

(65) Prior Publication Data
US 2017/0019504 A1 Jan. 19, 2017

(30) Foreign Application Priority Data
Feb. 17, 2014 (JP) .................................. 2014-027546

(51) Int. Cl.
*G06F 15/16* (2006.01)
*H04L 29/06* (2006.01)
(Continued)

(52) U.S. Cl.
CPC .............. *H04L 67/42* (2013.01); *H04L 67/10* (2013.01); *H04N 5/23238* (2013.01);
(Continued)

(58) Field of Classification Search
USPC .............. 348/39, 65, 14.03, 14.05; 396/429; 709/203, 206, 217, 219, 223, 224, 226,
(Continued)

(56) References Cited

U.S. PATENT DOCUMENTS 7,385,624 B2 6/2008 Takehara
2002/0191071 A1* 12/2002 Rui ........................ H04N 7/142
348/14.03

(Continued)

FOREIGN PATENT DOCUMENTS

JP 0955925 A 2/1997
JP 2003219389 A 7/2003
(Continued)

OTHER PUBLICATIONS

Office Action for corresponding JP application No. 2015-562689, 8 pages, dated Nov. 21, 2017.
(Continued)

*Primary Examiner* — Quang N Nguyen
(74) *Attorney, Agent, or Firm* — Matthew B. Dernier, Esq.

(57) ABSTRACT

The present invention provides an image transmission apparatus, an information processing terminal, an image transmission method, an information processing method, a program, and an information storage medium that allow a user to obtain a high-quality image according to a desired field-of-view range without constraining the communication band. A panorama image acquiring section acquires an image. A field-of-view range data accepting section accepts field-of-view range data associated with a field-of-view
(Continued)

range from a client. A clip image transmitting section transmits, to the client, an image that is an image generated on the basis of part of the acquired image and is according to the field-of-view range associated with the accepted field-of-view range data.

9 Claims, 6 Drawing Sheets

(51) Int. Cl.
*H04N 21/2187* (2011.01)
*H04N 21/2343* (2011.01)
*H04N 21/4728* (2011.01)
*H04L 29/08* (2006.01)
*H04N 5/232* (2006.01)

(52) U.S. Cl.
CPC ..... *H04N 21/2187* (2013.01); *H04N 21/2343* (2013.01); *H04N 21/4728* (2013.01)

(58) Field of Classification Search
USPC ................................ 709/228, 230, 232, 238
See application file for complete search history.

(56) References Cited

U.S. PATENT DOCUMENTS

| 2005/0212909 | A1  |   9/2005 | Takehara |              |
|--------------|-----|----------|----------|--------------|
| 2005/0285933 | A1* | 12/2005  | Rui      | H04N 7/142   |
|              |     |          |          | 348/14.03    |
| 2006/0078329 | A1* |  4/2006  | Ohnishi  | G08B 13/1968 |
|              |     |          |          | 396/429      |
| 2008/0122922 | A1* |  5/2008  | Geng     | G08B 13/19628|
|              |     |          |          | 348/39       |
| 2012/0155769 | A1* |  6/2012  | Yokomitsu| H04N 1/415   |
|              |     |          |          | 382/173      |
| 2013/0016198 | A1* |  1/2013  | Higuchi  | H04N 7/18    |
|              |     |          |          | 348/65       |

FOREIGN PATENT DOCUMENTS

| JP | 2004254031 A  |  9/2004 |
| JP | 2005192057 A  |  7/2005 |
| JP | 2005316914 A  | 11/2005 |
| JP | 2006157123 A  |  6/2006 |
| JP | 2013165429 A  |  8/2013 |
| WO | 2004066632 A1 |  8/2004 |

OTHER PUBLICATIONS

Yoshio Iwai et al., Construction of Omnidirectional High-definition Moving Image Delivery Server by Multichannel Delivery, IEEJ Transaction C, Japan, The Institute of Electrical Engineers of Japan, vol. 130, No. 4, pp. 712-722, ISSN 0385-4221, (Apr. 1, 2010) (for relevancy see Office Action for corresponding JP application No. 2015-562689, 8 pages, dated Nov. 21, 2017 cited above).

International Search Report for corresponding PCT application No. PCT/JP2014/076863, 4 pages, dated Jan. 13, 2015.

International Preliminary Report on Patentability and Written Opinion for corresponding PCT application No. PCT/JP2014/076863, 13 pages, dated Aug. 23, 2016.

* cited by examiner

F I G . 5
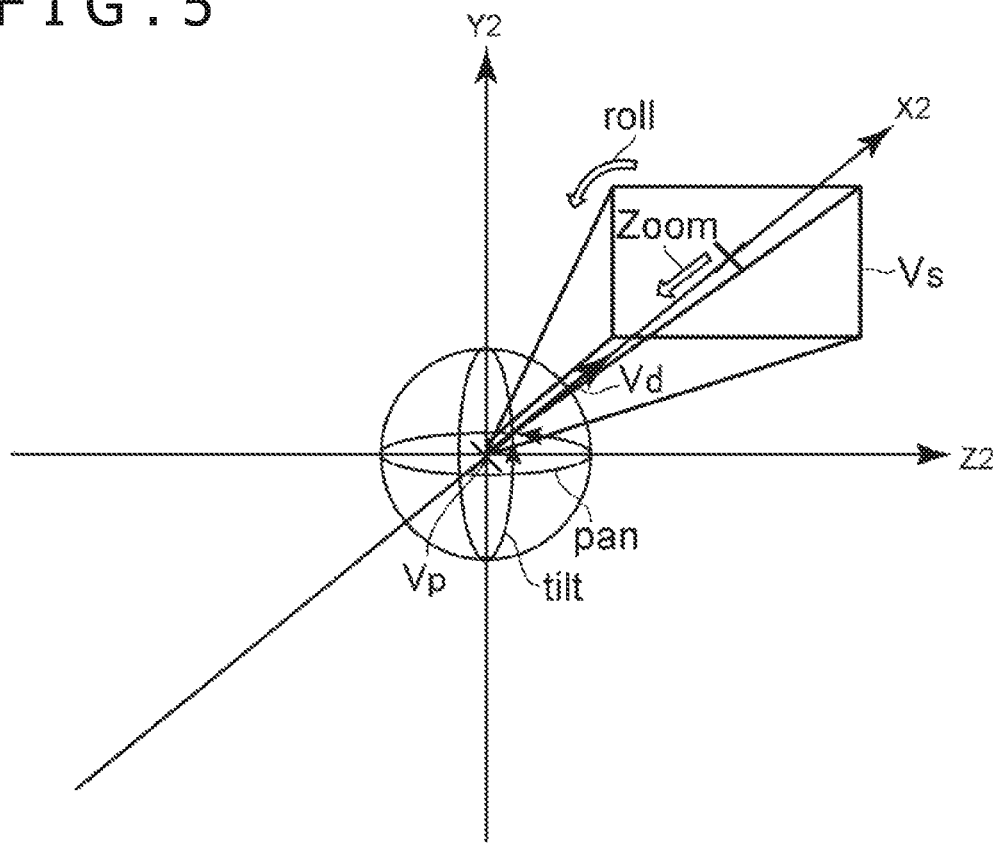

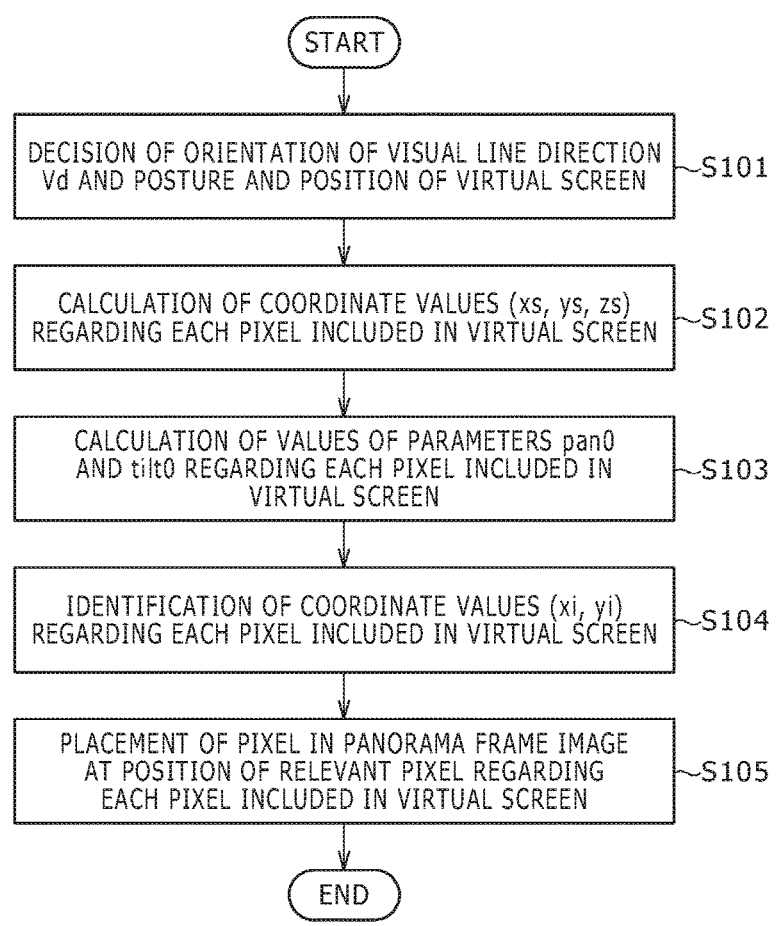

IMAGE TRANSMISSION APPARATUS, INFORMATION PROCESSING TERMINAL, IMAGE TRANSMISSION METHOD, INFORMATION PROCESSING METHOD, PROGRAM, AND INFORMATION STORAGE MEDIUM

TECHNICAL FIELD

The present invention relates to an image transmission apparatus, an information processing terminal, an image transmission method, an information processing method, a program, and an information storage medium.

BACKGROUND ART

An information processing terminal that receives an image such as an omnidirectional image from an image transmission apparatus such as a server and generates an image according to a field-of-view range specified by a user on the basis of part of the received image exists. With such an information processing terminal, the user can obtain an image according to a desired field-of-view range.

SUMMARY

Technical Problems

The image such as the omnidirectional image generally has a large size compared with a normal image of horizontal 1280 pixels×vertical 720 pixels or the like with the same quality for example. Therefore, with a conventional image transmission apparatus, possibly the communication band is constrained if an image with low quality such as a small size or low encoding quality is not transmitted. This becomes significant in the case in which the number of transmission destinations of the image is large or the case in which a moving image including the images as frame images is transmitted.

The present invention is made in view of the above-described problems and one of objects thereof is to provide an image transmission apparatus, an information processing terminal, an image transmission method, an information processing method, a program, and an information storage medium that allow a user to obtain a high-quality image according to a desired field-of-view range without constraining the communication band.

Solution to Problems

In order to solve the above-described problems, an image transmission apparatus according to the present invention is characterized by including an image acquiring section that acquires an image, a field-of-view range data accepting section that accepts field-of-view range data associated with a field-of-view range from an information processing terminal, and a transmitting section that transmits, to the information processing terminal, an image that is an image generated on the basis of part of the image acquired and is according to the field-of-view range associated with the field-of-view range data accepted.

Furthermore, an information processing terminal according to the present invention is characterized by including a field-of-view range data transmitting section that transmits field-of-view range data associated with a field-of-view range to an image transmission apparatus that transmits an image generated on the basis of part of an image acquired, and an accepting section that accepts, from the image transmission apparatus, the image that is generated by the image transmission apparatus on the basis of part of the image acquired and is according to the field-of-view range associated with the field-of-view range data.

Moreover, an image transmission method according to the present invention is characterized by including a step of acquiring an image, a step of accepting field-of-view range data associated with a field-of-view range from an information processing terminal, and a step of transmitting, to the information processing terminal, an image that is an image generated on the basis of part of the image acquired and is according to the field-of-view range associated with the field-of-view range data accepted.

In addition, an information processing method according to the present invention is characterized by including a step of transmitting field-of-view range data associated with a field-of-view range to an image transmission apparatus that transmits an image generated on the basis of part of an image acquired, and a step of accepting, from the image transmission apparatus, the image that is generated by the image transmission apparatus on the basis of part of the image acquired and is according to the field-of-view range associated with the field-of-view range data.

Furthermore, a program according to the present invention is characterized by causing a computer to execute a procedure of acquiring an image, a procedure of accepting field-of-view range data associated with a field-of-view range from an information processing terminal, and a procedure of transmitting, to the information processing terminal, an image that is an image generated on the basis of part of the image acquired and is according to the field-of-view range associated with the field-of-view range data accepted.

In addition, another program according to the present invention is characterized by causing a computer to execute a procedure of transmitting field-of-view range data associated with a field-of-view range to an image transmission apparatus that transmits an image generated on the basis of part of an image acquired, and a procedure of accepting, from the image transmission apparatus, the image that is generated by the image transmission apparatus on the basis of part of the image acquired and is according to the field-of-view range associated with the field-of-view range data.

Moreover, an information storage medium according to the present invention is a computer-readable information storage medium that stores a program characterized by causing a computer to execute a procedure of acquiring an image, a procedure of accepting field-of-view range data associated with a field-of-view range from an information processing terminal, and a procedure of transmitting, to the information processing terminal, an image that is an image generated on the basis of part of the image acquired and is according to the field-of-view range associated with the field-of-view range data accepted.

Furthermore, another information storage medium according to the present invention is a computer-readable information storage medium that stores a program characterized by causing a computer to execute a procedure of transmitting field-of-view range data associated with a field-of-view range to an image transmission apparatus that transmits an image generated on the basis of part of an image acquired, and a procedure of accepting, from the image transmission apparatus, the image that is generated by the image transmission apparatus on the basis of part of the image acquired and is according to the field-of-view range associated with the field-of-view range data.

In one aspect of the present invention, the image acquiring section acquires a plurality of images each associated with an image to be transmitted by the transmitting section, and the field-of-view range data accepting section accepts pieces of the field-of-view range data associated with field-of-view ranges about a plurality of timings. Furthermore, the transmitting section transmits, to the information processing terminal, a moving image including, as frame images, a plurality of images that are each an image generated on the basis of part of the image that is associated and acquired and are each an image according to the field-of-view range associated with the field-of-view range data about an associated timing.

Alternatively, the image acquiring section acquires a moving image, and the transmitting section transmits, to the information processing terminal, a moving image including, as frame images, images that are each an image generated on the basis of part of a frame image included in the moving image acquired and are each according to the field-of-view range associated with the field-of-view range data accepted.

Furthermore, in one aspect of the present invention, the field-of-view range data accepting section accepts the field-of-view range data from each of a plurality of information processing terminals, and the image transmission apparatus further includes a clip image generating section that generates the image that is an image generated on the basis of part of the image acquired and is according to the field-of-view range associated with the field-of-view range data accepted. In addition, the transmitting section transmits the image generated to the information processing terminal of a transmission source of the field-of-view range data associated with the image, and acceptance of the field-of-view range data and transmission of the image are carried out for each of the information processing terminals as transmission sources of the field-of-view range data in parallel.

BRIEF DESCRIPTION OF DRAWINGS

FIG. 5 is a diagram showing one example of a virtual space used for generation processing of a clip frame image.

FIG. 7 is a flow diagram showing one example of the flow of processing executed in a stitching server according to the one embodiment of the present invention.

DESCRIPTION OF EMBODIMENT

One embodiment of the present invention will be described in detail below on the basis of the drawings.

Figure 1:
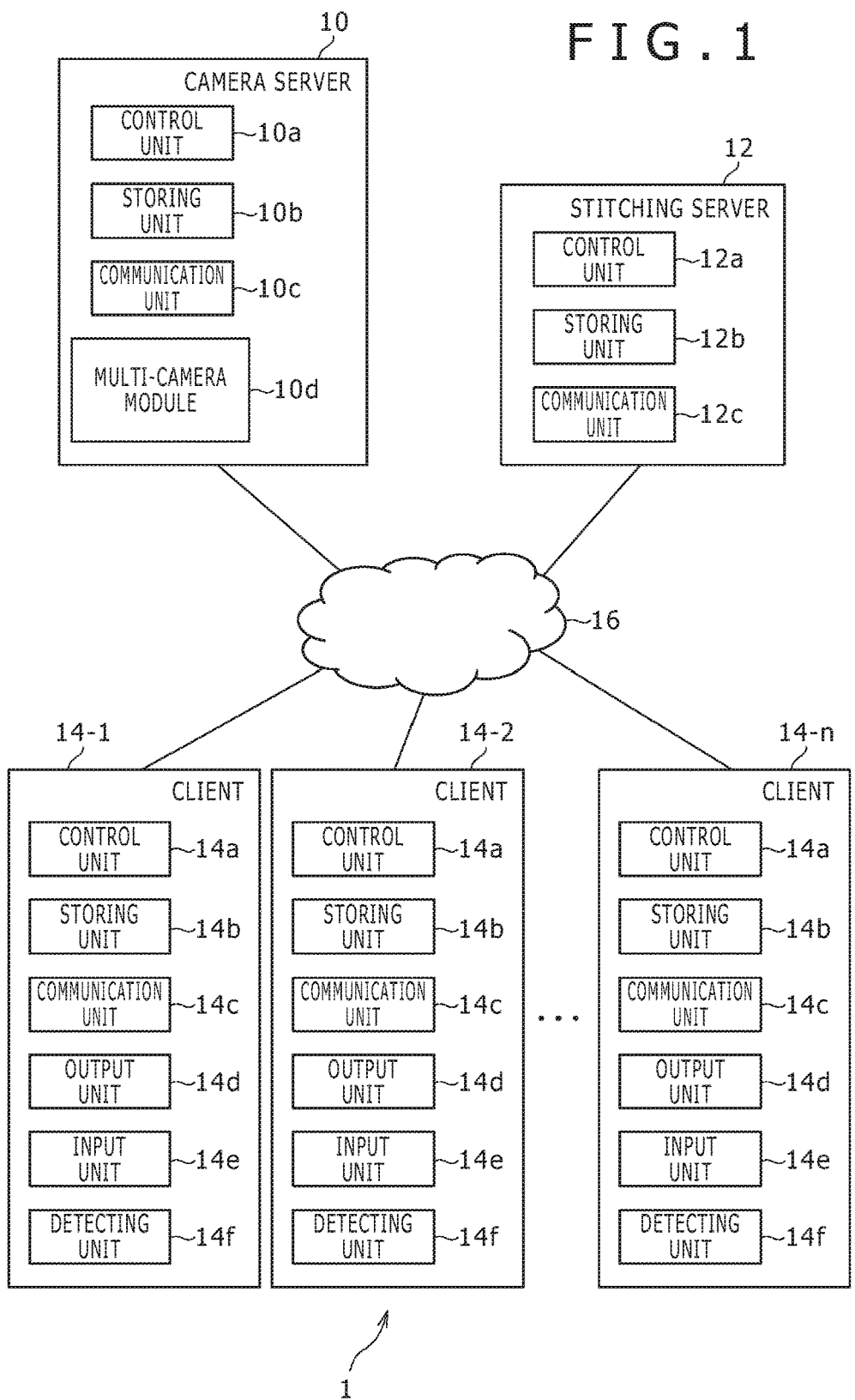
FIG. 1 is a diagram showing one example of the overall configuration of an image distribution system according to one embodiment of the present invention.

FIG. 1 is a diagram showing one example of the overall configuration of an image transmission system 1 according to the one embodiment of the present invention. As shown in FIG. 1, the image transmission system 1 according to the present embodiment includes a camera server 10, a stitching server 12, and clients 14 (14-1, 14-2, . . . , 14-$n$) each of which is configured based mainly on a computer. The camera server 10, the stitching server 12, and the clients 14 are connected to a computer network 16 such as the Internet. Furthermore, the camera server 10, the stitching server 12, and the clients 14 can communicate with each other.

As shown in FIG. 1, the camera server 10 includes a control unit 10$a$, a storing unit 10$b$, a communication unit 10$c$, and a multi-camera module 10$d$ for example. The control unit 10$a$ is a program control device such as a CPU (Central Processing Unit) for example, and executes various kinds of information processing in accordance with a program stored in the storing unit 10$b$. The storing unit 10$b$ is a memory element such as a ROM (Read-Only Memory) or a RAM (Random Access Memory), a hard disk drive, or the like for example. The communication unit 10$c$ is a communication interface for giving and receiving data to and from the stitching server 12 via the computer network 16 for example. The camera server 10 carries out transmission and reception of information with the stitching server 12 via the communication unit 10$c$. The multi-camera module 10$d$ includes plural cameras capable of imaging of directions different from each other. The multi-camera module 10$d$ according to the present embodiment includes cameras that carry out imaging of five horizontal directions different from each other and a camera that carries out imaging of the vertical upward direction. The placement of the plural cameras included in the multi-camera module 10$d$ does not particularly matter. For example, the multi-camera module 10$d$ may include cameras that carry out imaging of four horizontal directions different from each other, a camera that carries out imaging of the vertical upward direction, and a camera that carries out imaging of the vertical downward direction.

As shown in FIG. 1, the stitching server 12 includes a control unit 12$a$, a storing unit 12$b$, and a communication unit 12$c$ for example. The control unit 12$a$ is a program control device such as a CPU for example, and executes various kinds of information processing in accordance with a program stored in the storing unit 12$b$. In the control unit 12$a$ according to the present embodiment, a GPU (Graphics Processing Unit) that renders an image in a frame buffer on the basis of a graphics command and data supplied from the CPU is also included. The storing unit 12$b$ is a memory element such as a ROM or a RAM, a hard disk drive, or the like for example. Furthermore, in the storing unit 12$b$ according to the present embodiment, the area of the frame buffer, in which an image is rendered by the GPU, is ensured. The communication unit 12$c$ is a communication interface for giving and receiving data to and from the camera server 10 and the clients 14 via the computer network 16 for example.

The client 14 is a portable computer that is an information processing terminal used by a user and is a portable personal computer, a portable game device, a smartphone, or the like for example. The client 14 includes a control unit 14$a$, a storing unit 14$b$, a communication unit 14$c$, an output unit 14$d$, an input unit 14$e$, and a detecting unit 14$f$ for example. The control unit 14$a$ is a program control device such as a CPU for example, and executes various kinds of information processing in accordance with a program stored in the storing unit 14$b$. In the control unit 14$a$ according to the present embodiment, a GPU (Graphics Processing Unit) that renders an image in a frame buffer on the basis of a graphics command and data supplied from the CPU is also included. The storing unit 14$b$ is a memory element such as a ROM or a RAM, a hard disk drive, or the like for example. In the storing unit 14b, programs to be executed by the control unit 14a and so forth are stored. Furthermore, in the storing unit 14b according to the present embodiment, the area of the frame buffer, in which an image is rendered by the GPU, is ensured. The communication unit 14c is a communication interface for giving and receiving data to and from the stitching server 12 via the computer network 16 for example. The client 14 carries out transmission and reception of information with the stitching server 12 via the communication unit 14c. The output unit 14d is a display unit such as a display that displays and outputs information in accordance with an instruction input from the control unit 14a and a sound output unit such as a speaker that outputs sounds for example. The input unit 14e is a game controller, a touch pad, a keyboard, a microphone, or the like that outputs the contents of operation made by a user to the control unit 14a for example. The detecting unit 14f is a device, such as an acceleration sensor or a gyro sensor, which detects the posture and position of the client 14. The detecting unit 14f may be capable of detecting the movement amount and velocity of the client 14.

Figure 2:
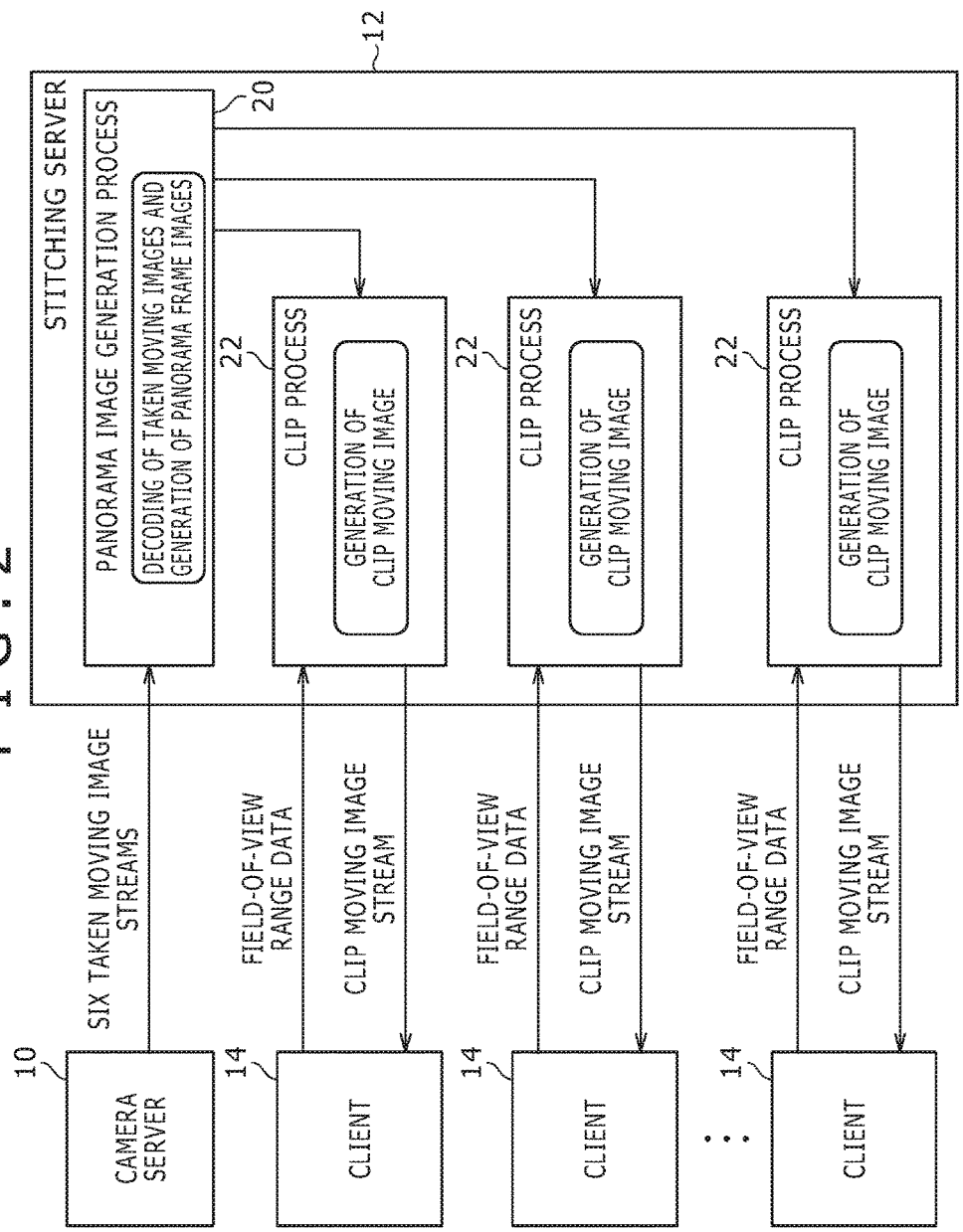
FIG. 2 is an explanatory diagram for explaining one example of image distribution carried out in the image distribution system according to the present embodiment.

With reference to FIG. 2, one example of image transmission carried out in the image transmission system 1 according to the present embodiment will be described below.

In the present embodiment, the respective cameras included in the multi-camera module 10d of the camera server 10 generate moving images independent of each other at a predetermined frame rate for example, specifically 30 fps for example. Hereinafter, these moving images will be referred to as taken moving images. Furthermore, frame images included in the taken moving image will be referred to as taken frame images. In the present embodiment, moving images in which frame images of horizontal 720 pixels×vertical 1280 pixels are included are generated by the cameras that carry out imaging of five horizontal directions different from each other. Furthermore, a moving image in which frame images of horizontal 480 pixels×vertical 640 pixels are included is generated by the camera that carries out imaging of the vertical upward direction. In this manner, the six independent taken moving images are generated in the present embodiment. Suppose that, in the present embodiment, the imaging timings in the respective cameras are synchronized and the taken frame image is associated with the imaging date and time of this taken frame image.

Furthermore, in the present embodiment, the camera server 10 encodes the plural taken moving images, here the six taken moving images, on the basis of a predetermined format, specifically MotionJPEG (Joint Photographic Experts Group) or the like for example, and then transmits the taken moving images to the stitching server 12 as taken moving image streams.

Moreover, in the present embodiment, a panorama image generation process 20 generated in the stitching server 12 receives these plural taken moving images from the camera server 10 and decodes them. In this manner, a series of taken frame images is acquired regarding each of the plural taken moving images. Then, on the basis of a group of decoded frame images associated with the same imaging date and time, the panorama image generation process 20 of the stitching server 12 generates a panorama image associated with this imaging date and time by a publicly-known method. Suppose that this panorama image is an omnidirectional image in the present embodiment. This panorama image will be referred to as a panorama frame image. Suppose that the generation of the panorama frame image is also carried out at a predetermined frame rate, specifically 30 fps here, in the present embodiment.

Figure 3:
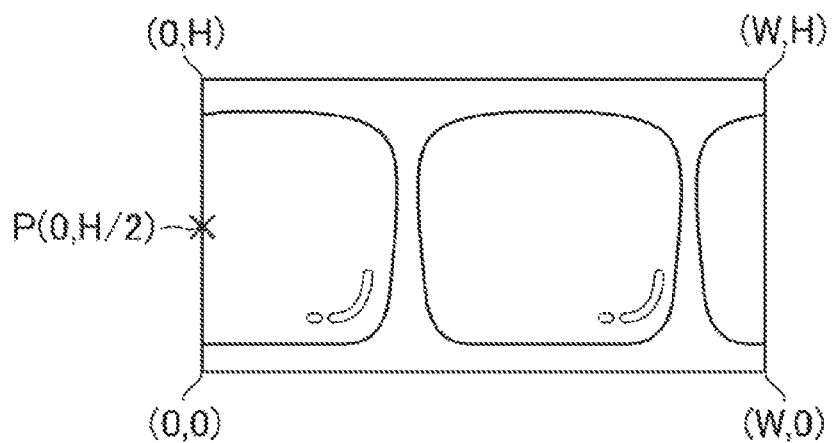
FIG. 3 is a diagram showing one example of a panorama frame image.

In FIG. 3, one example of the panorama frame image according to the present embodiment is schematically shown. Suppose that the number of pixels of the panorama frame image in the horizontal direction is W and the number of pixels in the vertical direction is H in the present embodiment. For example, if this panorama frame image is horizontal 3840 pixels×vertical 1920 pixels, W=3839 and H=1919 are satisfied. Furthermore, suppose that the coordinate values of the lower left end, lower right end, upper left end, and upper right end of this panorama frame image are (0, 0), (W, 0), (0, H), and (W, H), respectively.

Furthermore, in the present embodiment, when accepting a request for transmission of an image from the client 14, the stitching server 12 generates a clip process 22 associated with this client 14. Then, the client 14 that has made the request for transmission of an image and the clip process 22 are connected and a session is established between this client 14 and this clip process 22. In this manner, the same number of clip processes 22 as the number of clients 14 connected to the stitching server 12 are generated to be executed in the present embodiment.

Furthermore, the clip process 22 accepts, from the client 14 of the connection counterpart, field-of-view range data associated with a field-of-view range decided in this client 14. This field-of-view range is decided on the basis of the posture and position of this client 14 detected by the detecting unit 14f included in this client 14 for example. Furthermore, suppose that, in the present embodiment, the client 14 transmits the field-of-view range data associated with the detection date and time to the stitching server 12 at a predetermined frame rate, specifically e.g. 30 fps here.

Figure 4:
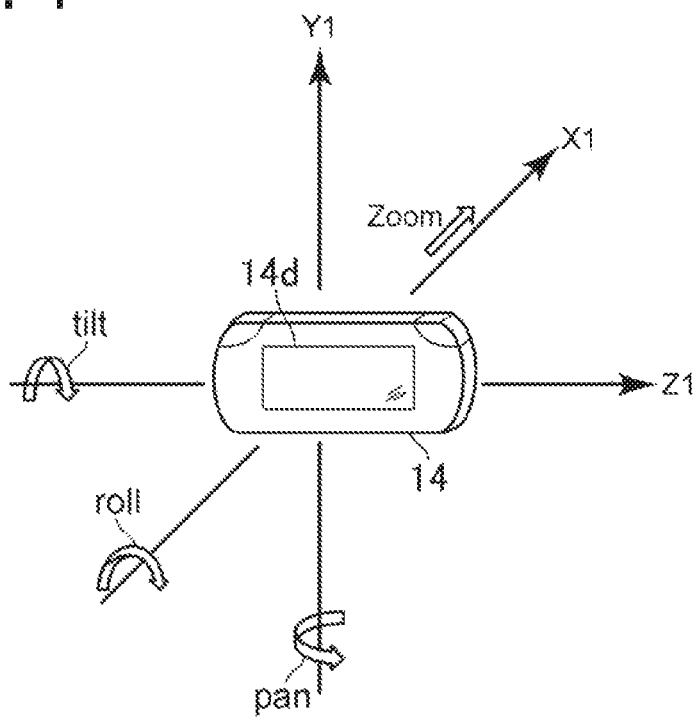
FIG. 4 is a diagram schematically showing one example of the relationship between the posture and position of a client and values of parameters.

In the present embodiment, for example, values of four parameters, i.e. pan, tilt, roll, and zoom, are included in the field-of-view range data. In the present embodiment, the user can input the values of these parameters by tilting and moving the client 14. In FIG. 4, one example of the relationship between the posture and position of the client 14 and the values of these four parameters is schematically shown.

As shown in FIG. 4, in the present embodiment, the direction from the surface in which a display as one kind of output unit 14d of the client 14 is disposed toward the back surface thereof is defined as the X1-axis positive direction. Furthermore, the direction from the lower side toward the upper side as viewed from the surface in which the display is disposed is defined as the Y1-axis positive direction. In addition, the direction from the left toward the right as viewed from the surface in which the display is disposed is defined as the Z1-axis positive direction.

Furthermore, suppose that, in the present embodiment, the posture when the client 14 with the posture serving as the basis shown in FIG. 4 is rotated by an angle pan1 around the Y1-axis, and by an angle tilt1 around the Z1-axis, and by an angle roll1 around the X1-axis is detected by the detecting unit 14f for example. Here, the angle pan1 represents an angle when the clockwise direction as viewed in the Y1-axis positive direction is defined as the positive direction. Furthermore, the angle tilt1 represents an angle when the clockwise direction as viewed in the Z1-axis positive direction is defined as the positive direction. In addition, the angle roll1 represents an angle when the clockwise direction as viewed in the X1-axis positive direction is defined as the positive direction. Furthermore, suppose that the position resulting from the movement of the client 14 at the position serving as the basis shown in FIG. 4 in the X1-axis positive direction by zoom1 is detected by the detecting unit 14f. In the above-described case, field-of-view range data in which pan1, tilt1, roll1, and zoom1 are set as the values of the parameters pan, tilt, roll, and zoom, respectively, is transmitted. Moreover, suppose that the field-of-view range data is associated with the detection date and time of the posture and position of the client 14 associated with this field-of-view range data in the present embodiment.

Furthermore, the clip process 22 that has received the relevant field-of-view range data acquires the panorama frame image generated by the panorama image generation process 20. Then, this clip process 22 generates a clip frame image that is an image generated on the basis of part of this panorama frame image and is an image according to the field-of-view range indicated by the field-of-view range data accepted from the client 14. The clip frame image according to the present embodiment is an image of horizontal 1280 pixels×vertical 720 pixels for example.

In the present embodiment, the clip frame image is generated on the basis of the panorama frame image acquired by the clip process 22 and the values of the above-described four parameters indicated by the field-of-view range data accepted by the clip process 22. Here, one example of generation processing of the clip frame image will be described.

FIG. 5 is a diagram showing one example of a virtual space used for the generation processing of the clip frame image. In the virtual space shown in FIG. 5, a virtual screen Vs that is a flat plane is disposed in parallel to Y2-Z2 plane. Furthermore, the X2 coordinate value of the position at which the virtual screen Vs is disposed is arbitrary. In addition, although the size of the virtual screen Vs is arbitrary, an image is disposed in the surface of the virtual screen Vs. In this image, plural pixels arranged vertically and horizontally at equal intervals, specifically e.g. horizontal 1280 pixels×vertical 720 pixels here, are included.

Furthermore, a point Vp of view is disposed at the origin of the virtual space shown in FIG. 5. In addition, a visual line direction Vd is set in the virtual space shown in FIG. 5. Moreover, with the placement serving as the basis, the X2 coordinate value of a unit vector representing the visual line direction Vd is 1 and the Y2 coordinate value and the Z2 coordinate value are both 0. Furthermore, suppose that the Y2-axis positive direction is the upward direction of the virtual screen Vs. In addition, in the present embodiment, a straight line that passes through the point Vp of view and extends along the visual line direction Vd passes through the centroid of the virtual screen Vs. Moreover, the centroid of the virtual screen Vs in the placement serving as the basis is associated with a point P (0, H/2) in the panorama frame image as shown in FIG. 3.

Here, suppose that for example the clip process 22 accepts field-of-view range data in which pan1, tilt1, roll1, and zoom1 are set as the values of the parameters pan, tilt, roll, and zoom, respectively. In this case, the orientation of the visual line direction Vd and the posture and position of the virtual screen Vs are decided on the basis of the values of this field-of-view range data in the following manner. Specifically, for example, the clip process 22 rotates the visual line direction Vd by an angle pan1 around the Y1-axis and by an angle tilt1 around the Z1-axis with respect to a reference direction (1, 0, 0). At this time, the placement of the virtual screen Vs changes according to the rotation of the visual line direction Vd. Here, the virtual screen Vs rotationally moves around the origin, with the positional relationship between the virtual screen Vs and the visual line direction Vd kept. That is, the straight line that passes through the point Vp of view and extends along the visual line direction Vd after the rotation passes through the centroid of the virtual screen Vs after the change. Then, the clip process 22 changes the position of the virtual screen Vs to the position resulting from movement in the opposite direction of the visual line direction Vd by zoom1. Furthermore, the clip process 22 rotates the virtual screen Vs anticlockwise around the visual line direction Vd by an angle roll1.

Then, regarding each pixel included in the virtual screen Vs, X2 coordinate value xs, Y2 coordinate value ys, and Z2 coordinate value zs of the intersection of a straight line linking the pixel and the point Vp of view and a spherical surface that is centered at the point Vp of view and has a radius length of 1 are calculated. Then, on the basis of the coordinate values (xs, ys, zs) calculated regarding each pixel, values of parameters pan0 and tilt0 associated with the pixel are identified. Here, for example, the values of the parameters pan0 and tilt0 are calculated in accordance with expressions of pan0=arccos(sqrt((xs×xs)/(1−ys×ys))) and tilt0=arcsin(ys).

Then, on the basis of the values of the parameter pan0 and the parameter tilt0 calculated regarding each pixel, coordinate values (xi, yi) of a position in the panorama frame image, associated with the pixel, are identified. Here, the coordinate values (xi, yi) are calculated in accordance with expressions of xi=−W×pan0/(2×pi) and yi=(H/2)×(1−tilt0/pi).

Then, at the position of each pixel placed on the virtual screen Vs, the pixel at the position (xi, yi) in the panorama frame image associated with the relevant pixel is placed. That is, each pixel included in the virtual screen Vs is replaced by the pixel at the position (xi, yi) in the panorama frame image associated with the relevant pixel. The image disposed on the surface of the virtual screen Vs after such replacement of the pixels is the clip frame image according to the present embodiment. In this manner, the clip frame image is generated on the basis of plural pixels included in the panorama frame image in the present embodiment.

Furthermore, the clip process 22 generates this clip frame image at a predetermined frame rate, specifically e.g. 30 fps here, and encodes the clip frame images to generate a moving image of the H.264 format. Hereinafter, this moving image will be referred to as a clip moving image. Then, the clip process 22 transmits this clip moving image as a clip moving image stream to the client 14 connected to this clip process 22.

Then, the client 14 receives the clip moving image as the clip moving image stream. Then, the client 14 causes the received clip moving image to be displayed on the output unit 14d such as a display. The client 14 may save the received clip moving image so as to allow a user to freely utilize the clip moving image. In the above-described manner, in the present embodiment, the user can obtain a moving image composed of clip frame images made by clipping from the panorama frame images according to a field-of-view range specified by setting the posture of the client 14 for example.

In the present embodiment, the direction of the client 14 associated with the field-of-view range is associated with the imaging direction of the multi-camera module 10d. Therefore, in the present embodiment, a clip frame image made by clipping a part obtained by imaging of the direction in which the client 14 is oriented at a certain timing in a panorama frame image based on taken frame images taken at this timing is displayed. Specifically, for example, suppose that the client 14 is oriented to the east at a certain timing t1 and thereafter the client 14 is oriented to the west at a different timing t2. Here, the orientation of the client 14 refers to the direction from the surface in which the display of the client 14 is disposed toward the back surface thereof, i.e. bearing here, for example. In this case, a clip frame image made by clipping a part obtained by imaging of the east in a panorama frame image based on taken frame images taken at the timing t1 is displayed. Thereafter, a clip frame image made by clipping a part obtained by imaging of the west in a panorama frame image based on taken frame images taken at the timing t2 is displayed.

Furthermore, in the present embodiment, from a panorama frame image based on taken images taken at the same timing as the detection date and time of the posture of the client 14, a clip frame image made by clipping the part of the field-of-view range associated with this posture is generated. Specifically, for example, the clip process 22 identifies a panorama frame image associated with the imaging date and time that is the same timing as the detection date and time associated with accepted field-of-view range data. Then, the clip process 22 generates a clip frame image composed of plural pixels included in this panorama frame image identified on the basis of the field-of-view range indicated by this field-of-view range data.

In the present embodiment, the generation of the clip frame image according to the field-of-view range specified in the client 14 is carried out not in the client 14 but in the stitching server 12. Then, the generated clip frame image is transmitted from the stitching server 12 to the client 14. Therefore, in the present embodiment, the possibility that the communication band is constrained is reduced compared with the case in which the panorama frame image, which has a larger size than the clip frame image, is transmitted from the stitching server 12 to the client 14. Thus, in the present embodiment, the user can obtain a high-quality image according to a desired field-of-view range without constraining the communication band.

Furthermore, in the present embodiment, the processing by the panorama image generation process 20 and the processing by the clip processes 22 associated with a respective one of plural clients 14 are asynchronously executed. Furthermore, the processing by the clip processes 22 is executed in parallel for each of the clients 14, i.e. for each of pieces of accepted field-of-view range data. Therefore, in the present embodiment, users can view, by the respective clients 14, clip frame images that are based on one panorama frame image and are according to field-of-view ranges different from each other.

Moreover, in the present embodiment, the processing by the panorama image generation process 20 and the processing by the clip process 22 are both executed in real time by the GPU included in the stitching server 12. Therefore, a clip moving image generated on the basis of a taken moving image without much delay from the imaging timing of this taken moving image is displayed on the display of the client 14.

A further description will be made below about functions of the image transmission system 1 according to the present embodiment.

Figure 6:
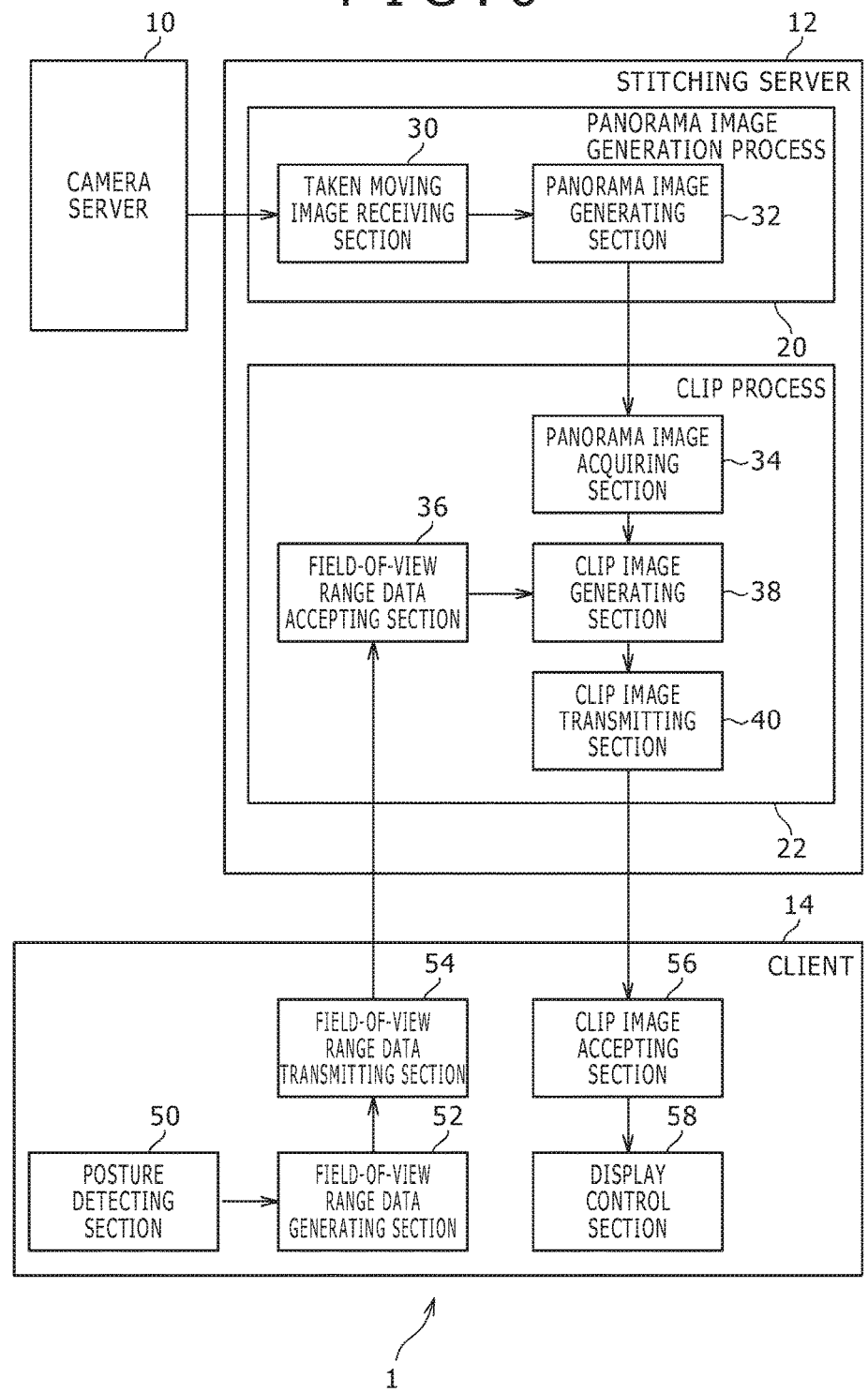
FIG. 6 is a functional block diagram showing one example of functions implemented in the image distribution system according to the one embodiment of the present invention.

FIG. 6 is a functional block diagram showing one example of functions implemented in the image transmission system 1 according to the present embodiment. In the image transmission system 1 according to the present embodiment, all of the functions shown in FIG. 6 do not need to be implemented and a function other than the functions shown in FIG. 6 may be implemented.

As shown in FIG. 6, the stitching server 12 according to the present embodiment functionally includes a taken moving image receiving section 30, a panorama image generating section 32, a panorama image acquiring section 34, a field-of-view range data accepting section 36, a clip image generating section 38, and a clip image transmitting section 40 for example. The taken moving image receiving section 30, the field-of-view range data accepting section 36, and the clip image transmitting section 40 are implemented based mainly on the communication unit 12c. The panorama image generating section 32, the panorama image acquiring section 34, and the clip image generating section 38 are implemented based mainly on the control unit 12a, particularly the GPU. Furthermore, the taken moving image receiving section 30 and the panorama image generating section 32 are equivalent to functions executed by the panorama image generation process 20. Moreover, the panorama image acquiring section 34, the field-of-view range data accepting section 36, the clip image generating section 38, and the clip image transmitting section 40 are equivalent to functions executed by the clip process 22. In the above-described manner, the stitching server 12 according to the present embodiment plays a role as an image transmission apparatus that transmits images.

Furthermore, the above functions are implemented by executing a program that is installed on the stitching server 12, which is a computer, and includes commands corresponding to the above functions by the control unit 12a of the stitching server 12. For example, this program is supplied to the stitching server 12 via a computer-readable information storage medium such as optical disk, magnetic disk, magnetic tape, magneto-optical disk, and flash memory or via a computer network such as the Internet. Suppose that, in the present embodiment, the panorama image generation process 20 is generated by executing a panorama image generation program that is one kind of the above-described program and the clip process 22 is generated by executing another clip program that is the above-described program. The panorama image generation process 20 and the clip process 22 may be generated by executing one program.

Furthermore, as shown in FIG. 6, the client 14 according to the present embodiment functionally includes a posture detecting section 50, a field-of-view range data generating section 52, a field-of-view range data transmitting section 54, a clip image accepting section 56, and a display control section 58 for example. The posture detecting section 50 is implemented based mainly on the detecting unit 14f. The field-of-view range data generating section 52 is implemented based mainly on the control unit 14a. The field-of-view range data transmitting section 54 and the clip image accepting section 56 are implemented based mainly on the communication unit 14c. The display control section 58 is implemented based mainly on the control unit 14a and the output unit 14d.

Furthermore, the above functions are implemented by executing a program that is installed on the client 14, which is a computer, and includes commands corresponding to the above functions by the control unit 14a of the client 14. For example, this program is supplied to the client 14 via a computer-readable information storage medium such as optical disk, magnetic disk, magnetic tape, magneto-optical disk, and flash memory or via a computer network such as the Internet.

The posture detecting section 50 detects the posture of the client 14. Furthermore, the posture detecting section 50 according to the present embodiment detects not only the posture of the client 14 but also its position, velocity, movement amount, and so forth as described above.

The field-of-view range data generating section 52 generates field-of-view range data. In the present embodiment, the field-of-view range data generating section 52 generates the field-of-view range data on the basis of the posture and position of the client 14 detected by the posture detecting section 50. In the present embodiment, the value of each of the parameters pan, tilt, roll, and zoom is included in the field-of-view range data as described above. In the present embodiment, the field-of-view range data is associated with the detection date and time of the posture and position of the client 14 corresponding to this field-of-view range data. Furthermore, in the present embodiment, pieces of field-of-view range data associated with field-of-view ranges about plural detection timings are generated.

The field-of-view range data transmitting section 54 transmits the field-of-view range data to the stitching server 12. In the present embodiment, the field-of-view range data transmitting section 54 transmits the field-of-view range data generated by the field-of-view range data generating section 52 to the stitching server 12.

As described above, the field-of-view range data generating section 52 may generate the field-of-view range data at a predetermined frame rate, specifically e.g. 30 fps, and the field-of-view range data transmitting section 54 may transmit the field-of-view range data generated at this frame rate.

Alternatively, in response to acceptance of predetermined explicit transmission operation by a user, the field-of-view range data generating section 52 may generate the field-of-view range data on the basis of the result of detection of the posture of the client 14 by the posture detecting section 50 and the field-of-view range data transmitting section 54 may transmit this field-of-view range data.

The clip image accepting section 56 accepts, from the stitching server 12, an image that is generated by the stitching server 12 on the basis of part of a panorama image and is according to the field-of-view range associated with the field-of-view range data transmitted by the field-of-view range data transmitting section 54. The clip image accepting section 56 accepts the above-described clip moving image as a clip moving image stream in the present embodiment.

The display control section 58 causes the output unit 14*d* to display the image accepted by the clip image accepting section 56. The display control section 58 causes the output unit 14*d* to display the clip moving image. Furthermore, the display control section 58 may cause an area occupying part of the whole clip moving image to be displayed. In addition, the displayed area may be moved in the upward, downward, left, and right directions for example according to change operation accepted from a user. This can change the field-of-view range in the accepted clip moving image in the client 14.

The taken moving image receiving section 30 receives taken moving images. In the present embodiment, the taken moving image receiving section 30 receives six independent taken moving images from the camera server 10.

The panorama image generating section 32 generates a panorama image on the basis of the plural taken images, which are images obtained by imaging of directions different from each other. In the present embodiment, the panorama image generating section 32 decodes the six independent taken moving images to acquire taken frame images as described above. Then, on the basis of a group of decoded frame images associated with the same imaging date and time, the panorama image generating section 32 generates a panorama frame image associated with this imaging date and time by a publicly-known method.

The panorama image acquiring section 34 acquires images. In the present embodiment, the panorama image acquiring section 34 acquires the panorama images generated by the panorama image generating section 32. The panorama image acquiring section 34 may acquire panorama images included as frame images in a moving image stored in the storing unit 12*b* of the stitching server 12 in advance for example. Furthermore, in the present embodiment, the panorama image acquiring section 34 acquires panorama frame images each associated with a frame image included in a clip moving image to be transmitted by the clip image transmitting section 40. As above, the panorama image acquiring section 34 acquires the moving image in the present embodiment.

The field-of-view range data accepting section 36 accepts field-of-view range data associated with a field-of-view range from the client 14. In the present embodiment, the field-of-view range data accepting section 36 accepts pieces of field-of-view range data associated with field-of-view ranges about plural timings. If the field-of-view range data transmitting section 54 transmits the field-of-view range data at a predetermined frame rate, the field-of-view range data accepting section 36 accepts the field-of-view range data at this frame rate. Furthermore, if the field-of-view range data transmitting section 54 transmits the field-of-view range data in response to predetermined explicit transmission operation, the field-of-view range data accepting section 36 accepts the field-of-view range data every time the field-of-view range data is transmitted. Moreover, in the present embodiment, the field-of-view range data accepting section 36 accepts the field-of-view range data from each of the plural clients 14.

The clip image generating section 38 generates an image that is an image generated on the basis of part of the image acquired by the panorama image acquiring section 34 and is according to the field-of-view range associated with the accepted field-of-view range data. As described above, a clip frame image is generated at a predetermined frame rate, specifically e.g. 30 fps, in the present embodiment. Furthermore, the clip image generating section 38 encodes the generated clip frame images to generate a clip moving image of the H.264 format for example. This clip frame image is an image generated on the basis of part of a panorama frame image associated with this clip frame image as described above. Moreover, this clip frame image is an image according to the field-of-view range associated with the field-of-view range data about the timing associated with this clip frame image. In addition, in the present embodiment, the generation of the clip moving image by the clip image generating section 38 is carried out for each of the associated clients 14 in parallel.

Furthermore, in the present embodiment, the field-of-view range data accepting section 36 holds the value of the field-of-view range data accepted last, i.e. the value of the newest field-of-view range data. Moreover, when the field-of-view range data accepting section 36 accepts field-of-view range data, the clip image generating section 38 changes the value of the held field-of-view range data to the value of the accepted field-of-view range data. Then, the clip image generating section 38 generates a clip frame image on the basis of the value of the held field-of-view range data and part of a panorama frame image.

The field-of-view range data transmitting section 54 may transmit field-of-view range data indicating the difference between the posture represented by the field-of-view range data transmitted by the previous transmission and the present posture of the client 14 or the difference between the position represented by the field-of-view range data transmitted by the previous transmission and the present position of the client 14. In this case, the clip image generating section 38 adds the value of the accepted field-of-view range data to the value of the held field-of-view range data.

The clip image transmitting section 40 transmits, to the client 14, the image that is the image generated on the basis of part of the image acquired by the panorama image acquiring section 34 and is according to the field-of-view range associated with the accepted field-of-view range data. In the present embodiment, the clip image transmitting section 40 transmits the clip moving image generated by the clip image generating section 38 to the client 14 as a clip moving image stream. As above, the clip image transmitting section 40 transmits the moving image to the client 14 in the present embodiment. Here, each of frame images included in this moving image is an image generated on the basis of part of a frame image included in the moving image acquired by the panorama image acquiring section 34. Furthermore, each of the frame images included in this moving image is the image according to the field-of-view range associated with the accepted field-of-view range data. Moreover, in the present embodiment, the transmission of the clip moving image by the clip image transmitting section 40 is carried out in parallel for each of the clients 14 as the transmission sources of the field-of-view range data.

One example of generation processing of the clip frame image based on the acquired panorama frame image, executed in the stitching server 12 according to the present embodiment, will be described below with reference to a flow diagram shown in FIG. 7.

First the clip image generating section 38 decides the orientation of the visual line direction Vd and the posture and position of the virtual screen Vs in the above-described manner on the basis of the value of the held field-of-view range data (S101). Then, regarding each pixel included in the virtual screen Vs, the clip image generating section 38 calculates the coordinate values (xs, ys, zs) of the intersection of a straight line linking the pixel and the point Vp of view and a spherical surface that is centered at the point Vp of view and has a radius length of 1 (S102). Then, regarding each pixel included in the virtual screen Vs, the clip image generating section 38 calculates the values of the parameters pan0 and tilt0 in the above-described manner on the basis of the calculated coordinate values (xs, ys, zs) associated with the pixel (S103). Then, regarding each pixel included in the virtual screen Vs, the clip image generating section 38 identifies the coordinate values (xi, yi) of the position in the panorama frame image on the basis of the values of the parameters pan0 and tilt0 associated with the pixel (S104). The coordinate values (xi, yi) identified in this manner are associated with the relevant pixel included in the virtual screen Vs. Then, regarding each pixel included in the virtual screen Vs, the clip image generating section 38 places the pixel at the position represented by the coordinate values (xi, yi) in the panorama frame image that are associated with the relevant pixel and are identified by the processing shown in S104, at the position of the relevant pixel (S105). The image disposed on the surface of the virtual screen Vs after the end of the processing shown in S105 is the clip frame image according to the present embodiment. In this manner, in the present embodiment, the clip image generating section 38 executes the processing shown in the above-described S101 to S105, thereby generating the clip frame image.

The order of execution of the above-described processing does not particularly matter. For example, execution of the processing shown in the above-described S103 to S105 regarding any pixel included in the virtual screen Vs may be repeatedly carried out regarding all pixels included in the virtual screen Vs. Furthermore, the generation method of the clip frame image is not limited to the above-described one. For example, a panorama frame image may be attached, as a texture, to the inside of a 3D (three-dimensional) object of a spherical surface that is disposed in a virtual space and has a radius of a predetermined length. Furthermore, an image representing appearance when a look in the visual line direction Vd from the point Vp of view is taken may be generated as the clip frame image.

The present invention is not limited to the above-described embodiment.

For example, the clip moving image does not have to be generated in the clip process 22 associated with the client 14 with a one-to-one correspondence. Furthermore, the clip moving image may be generated in the clip process 22 that can connect to plural clients 14. Moreover, for example, if the field-of-view range data accepting section 36 accepts pieces of field-of-view range data whose difference in the field-of-view range is smaller than a predetermined difference from plural clients 14 different from each other, the clip image generating section 38 may generate a common image, here a common clip frame image. Then, the clip image transmitting section 40 may transmit the generated common clip frame image to these plural clients 14. This makes it possible to reduce the generation load of the clip moving image, such as the load of encoding of the clip moving image in the stitching server 12.

In this case, the clip image generating section 38 may generate a common image of a field-of-view range containing the field-of-view ranges indicated by the pieces of field-of-view range data accepted from these plural information processing terminals. Then, the clip image transmitting section 40 may transmit the generated common image to the plural clients 14.

Furthermore, in this case, the clip image transmitting section 40 may transmit area data in association with the common image to each of the plural clients 14 to which this common image is transmitted. Here, the area data is data indicating an area that occupies part of the common image and is associated with the field-of-view range data accepted from the client 14 of the transmission source of this area data for example. Then, the display control section 58 of the client 14 may display the area that occupies part of the whole clip moving image and is indicated by the area data accepted by this client 14. If this is done, on the output unit 14*d* of each of the plural clients 14 to which the common clip moving image is transmitted, part of this clip moving image that is according to the posture of the client 14 and is different from each other is displayed.

Moreover, for example, the generation of the clip frame image does not need to be carried out in response to and after acceptance of field-of-view range data and may be carried out before the acceptance of the field-of-view range data. Specifically, for example, the panorama image generation process 20 may generate plural clip frame images associated with a respective one of plural parts of a panorama frame image different from each other. Here, each of these plural clip frame images may be associated with a field-of-view range. Then, the clip process 22 may select a clip frame image associated with a part according to a field-of-view range associated with accepted field-of-view range data from these plural clip frame images, and transmit the selected clip frame image to the client 14. Here, for example, a clip frame image associated with a field-of-view range closest to the field-of-view range associated with the field-of-view range data may be selected and this clip frame image may be transmitted to the client 14.

Furthermore, the frame rate of the taken moving image and the frame rate of the clip moving image may be different. Moreover, the frame rate of the taken moving image and the frame rate of the panorama moving image may also be different. In addition, the frame rate of a transmission moving image may be variable depending on the degree of constraint of the communication band and the number of connected clients.

Furthermore, for example, a clip frame image made by clipping a part of a field-of-view range associated with the posture of the client 14 does not need to be generated from a panorama frame image based on taken images taken at the same timing as the detection date and time of this posture. For example, the clip frame image may be generated on the basis of a panorama frame image based on taken images taken previous to the detection date and time of the posture by a predetermined time. Moreover, the clip frame image may be generated on the basis of a panorama frame image based on taken images taken at imaging date and time closest to the detection date and time of the posture.

Furthermore, the client 14 does not need to be a portable computer. For example, the client 14 may be a stationary-type information processing device, a head-mounted display, or the like. In addition, the client 14 may include a detecting device that can detect the visual line or the point of gaze of a user. In this detecting device, the visual line or the point of gaze of a user is detected on the basis of the position of the iris on the basis of the position of the corner of the eye of the user in an image of the eye of the user photographed by a camera for example. Moreover, for example, there also exists a detecting device that detects the visual line or the point of gaze of a user on the basis of the position of the pupil relative to the position, on the cornea, of reflected light made through irradiation with an infrared ray in an image of the eye of the user photographed by a camera.

Furthermore, for example, regarding an area associated with the position detected by the above-described detecting device, a clip frame image having a higher resolution than in the other area may be generated. For example, an area in the virtual screen Vs exemplified in FIG. 5 may be decided on the basis of the direction of the visual line or the position of the point of gaze detected by the detecting device. Here, for example, the position in the virtual screen Vs associated with the direction of the visual line or the position of the point of gaze is identified. In addition, regarding an area with a predetermined size having this position as the centroid, the resolution of a displayed image may be set higher than in the other area. For example, if the direction of the visual line of a user is the direction toward the upper left side, a clip frame image having a higher resolution in an area that is located on the upper left side in the virtual screen Vs and has a predetermined size than in the other area may be generated. If this is done, while the whole of a clip frame image is allowed to be displayed with a lower amount of communication than in the case of displaying a clip frame image having a uniform resolution, an image having this resolution can be allowed to be displayed regarding the vicinity of the position at which the user is gazing.

Furthermore, for example, the displayed image may be allowed to scroll on the basis of the direction of the visual line or the position of the point of gaze of a user. For example, the virtual screen Vs exemplified in FIG. 5 may be allowed to scroll with speed and direction according to the orientation of the present visual line direction of a user for the case in which the visual line of the user is straight. Here, for example if the visual line of the user is in the left direction, the virtual screen Vs may be allowed to scroll in the left direction by increasing the value of the parameter pan of field-of-view range data. Then, a clip frame image may be generated on the basis of the value of the field-of-view range data after the change. This allows the user to change the part clipped as the clip frame image from the panorama frame image by the visual line.

Moreover, for example, if the direction of the visual line or the position of the point of gaze of a user does not change for a predetermined time or if change in the predetermined time is equal to or smaller than a predetermined threshold, processing of zooming-in in a direction associated with the direction of the visual line or the position of the point of gaze may be executed. Here, for example, a position in the virtual screen Vs associated with the direction of the visual line or the position of the point of gaze may be identified. Furthermore, the position of the virtual screen Vs may be allowed to change in such a manner that an area centered at the identified position is caused to zoom in. Alternatively, for example, a predetermined area centered at a position in a clip frame image associated with the direction of the visual line or the position of the point of gaze may be identified. Then, the processing of zooming-in may be executed by clipping an image occupying this area from the clip frame image and causing this clipped image to be displayed in an enlarged manner. Furthermore, similarly, if the direction of the visual line or the position of the point of gaze of a user does not change for a predetermined time or if change in the predetermined time is equal to or smaller than a predetermined threshold, processing of zooming-out in a direction associated with the direction of the visual line or the position of the point of gaze may be executed. This allows the user to cause the stitching server 12 or the client 14 to execute the processing of zooming-in or the processing of zooming-out by the visual line.

Furthermore, for example, field-of-view range data generated on the basis of visual line setting operation accepted from a user may be transmitted to the stitching server 12.

Moreover, the camera server 10 and the stitching server 12 may be each composed of plural casings. In addition, the allocation of roles to the camera server 10, the stitching server 12, and the client 14 is not limited to the above-described one. For example, the camera server 10 and the stitching server 12 may be integrated.

Furthermore, the above-described concrete character strings and the concrete character strings in the drawings are exemplification and the present invention is not limited by these character strings.

The invention claimed is:

1. An image transmission apparatus comprising:
   an image acquiring circuit that acquires an omnidirectional image;
   a field-of-view range data accepting circuit that accepts field-of-view range data associated with a field-of-view range from an information processing terminal; and
   a transmitting circuit that transmits, to the terminal, a portion of the image that is smaller than the image, the portion being selected according to the field-of-view range associated with the field-of-view range data accepted;
   wherein the field-of-view range is decided in the terminal based on at least one of a posture and a position of the terminal, the at least one of the posture and the position being detected by a detecting unit included in the terminal; and wherein when the field-of-view range data accepting circuit accepts, from an other terminal, field-of-view range data whose difference in its associated field-of-view range is smaller than a pre-determined difference in the field-of-view range decided in the terminal, the transmitting circuit transmits the portion to the terminal and to the other terminal.

2. The image transmission apparatus according to claim 1, wherein the image acquiring circuit acquires a plurality of images each associated with an image to be transmitted by the transmitting circuit, the field-of-view range data accepting circuit accepts pieces of the field-of-view range data associated with field-of-view ranges about a plurality of timings, and the transmitting circuit transmits, to the terminal, a moving image including, as frame images, a plurality of images that are each an image generated on the basis of part of the image that is associated and acquired and are each an image according to the field-of-view range associated with the field-of-view range data about an associated timing.

3. The image transmission apparatus according to claim 1, wherein the image acquiring circuit acquires a moving image, and the transmitting circuit transmits, to the terminal, a moving image including, as frame images, images that are each an image generated on the basis of part of a frame image included in the moving image acquired and are each according to the field-of-view range associated with the field-of-view range data accepted.

4. The image transmission apparatus according to claim 1, wherein the field-of-view range data accepting circuit accepts the field-of-view range data from each of a plurality of terminals, the apparatus further includes a clip image generating circuit that generates the image that is an image generated on the basis of part of the image acquired and is according to the field-of-view range associated with the field-of-view range data accepted, the transmitting circuit transmits the image generated to the terminal of a transmission source of the field-of-view range data associated with the image, and acceptance of the field-of-view range data and transmission of the image are carried out for each of the terminals as transmission sources of the field-of-view range data in parallel.

5. An information processing terminal comprising:

a detecting circuit;

a field-of-view range data transmitting circuit that transmits field-of-view range data associated with a field-of-view range to an image transmission apparatus that transmits a portion of an omnidirectional image acquired; and an image accepting circuit that accepts, from the apparatus, the portion of the image, the portion being smaller than the image, the portion being selected according to the field-of-view range associated with the field-of-view range data;

wherein the field-of-view range is decided in the terminal based on at least one of a posture and a position of the terminal, the at least one of the posture and the position being detected by the detecting circuit; and wherein when a field-of-view range data accepting circuit accepts, from an other terminal, field-of-view range data whose difference in its associated field-of-view range is smaller than a pre-determined difference in the field-of-view range decided in the terminal, a transmitting circuit transmits the portion to the terminal and to the other terminal.

6. An image transmission method comprising:

acquiring an omnidirectional image;

accepting field-of-view range data associated with a field-of-view range from an information processing terminal; and transmitting, to the terminal, a portion of the image that is smaller than the image, the portion being selected according to the field-of-view range associated with the field-of-view range data accepted;

wherein the field-of-view range is decided in the terminal based on at least one of a posture and a position of the terminal, the at least one of the posture and the position being detected by a detecting circuit included in the terminal; and wherein when accepting, from an other terminal, field-of-view range data whose difference in its associated field-of-view range is smaller than a pre-determined difference in the field-of-view range decided in the terminal, transmitting the portion to the terminal and to the other terminal.

7. An information processing method comprising:

detecting at least one of a posture and a position;

deciding a field-of-view range based on at least one of the posture and the position;

transmitting field-of-view range data associated with the field-of-view range to an image transmission apparatus that transmits a portion of an omnidirectional image acquired; and accepting, from the apparatus, the portion of the image, the portion being smaller than the image, the portion being selected according to the field-of-view range associated with the field-of-view range data;

wherein when, by the apparatus, field-of-view range data is accepted whose difference in its associated field-of-view range is smaller than a pre-determined difference in the decided field-of-view range, the portion is transmitted by the apparatus to a plurality of information processing terminals.

8. A non-transitory, computer readable storage medium containing a computer program, which when executed by a computer, causes the computer to carry out actions, comprising:

acquiring, by an image acquiring circuit, an omnidirectional image;

accepting, by a field-of-view range data accepting circuit, field-of-view range data associated with a field-of-view range from an information processing terminal; and transmitting, by a transmitting circuit, to the terminal, a portion of the image that is smaller than the image, the portion being selected according to the field-of-view range associated with the field-of-view range data accepted;

wherein the field-of-view range is decided in the terminal based on at least one of a posture and a position of the terminal, the at least one of the posture and the position being detected by a detecting circuit included in the terminal; and wherein when accepting, from an other terminal, field-of-view range data whose difference in its associated field-of-view range is smaller than a pre-determined difference in the field-of-view range decided in the terminal, transmitting the portion to the terminal and to the other terminal.

9. A non-transitory, computer readable storage medium containing a computer program, which when executed by a computer, causes the computer to carry out actions, comprising:

detecting, by a detection circuit, at least one of a posture and a position;

deciding, by a deciding circuit, a field-of-view range based on at least one of the posture and the position;

transmitting, by a field-of-view range data transmitting circuit, field-of-view range data associated with the field-of-view range to an image transmission apparatus that transmits a portion of an omnidirectional image acquired; and accepting, by an accepting circuit, from the apparatus, the portion of the image, the portion being smaller than the image, the portion being selected according to the field-of-view range associated with the field-of-view range data;

wherein when, by the apparatus, field-of-view range data is accepted whose difference in its associated field-of-view range is smaller than a pre-determined difference in the decided field-of-view range, the portion is transmitted by the apparatus to a plurality of information processing terminals.

* * * * *